United States Patent [19]

Bender

[11] Patent Number: 5,375,139
[45] Date of Patent: Dec. 20, 1994

[54] ELECTRIC ARC FURNACE INSITU SCRAP PREHEATING PROCESS

[76] Inventor: Manfred Bender, 9304 Civic Center Dr. #3, Beverly Hills, Calif. 90210

[21] Appl. No.: 993,670

[22] Filed: Feb. 26, 1993

[51] Int. Cl.⁵ .................................................. F27D 23/04
[52] U.S. Cl. .................................................. 373/85; 373/81
[58] Field of Search .................. 373/77, 80, 81, 82–85

[56] References Cited

U.S. PATENT DOCUMENTS

| | | | |
|---|---|---|---|
| 2,303,973 | 12/1942 | Armstrong | 373/82 |
| 2,769,705 | 11/1956 | Övrom Sem | 373/81 |
| 3,666,871 | 5/1972 | Thom et al. | 373/81 |
| 4,160,868 | 7/1979 | Marchner et al. | 373/81 |
| 4,617,671 | 10/1986 | Lugscheider et al. | 373/22 |
| 4,816,230 | 3/1989 | Bortnik et al. | 373/82 |

FOREIGN PATENT DOCUMENTS 0462898 12/1991 France.
3629055 3/1988 Germany.

Primary Examiner—Bruce A. Reynolds
Assistant Examiner—Tu Hoang
Attorney, Agent, or Firm—Sughrue, Mion, Zinn, Macpeak & Seas

[57] ABSTRACT

The present invention discloses an electric arc furnace wherein the natural gas flow is artificially altered to obtain beneficial effects. By injecting gases, preferably but not necessarily containing oxygen, into the electric arc furnace in the vicinity of the electrode port, the injected gases move vertically downward near the furnace center toward the bath. This process of injecting gases downward around the electrode enables the natural circulation in the furnace to be reversed. When gases reach the bath level, they disperse outward penetrating the scrap and depositing heat energy thereon. By preheating the scrap in this manner production is increased and emissions released into the off-gas system can be reduced.

11 Claims, 1 Drawing Sheet

ELECTRIC ARC FURNACE INSITU SCRAP PREHEATING PROCESS

BACKGROUND OF THE INVENTION

The present invention relates to electric arc furnaces and, more particularly, to controlling the gas flow inside the chamber of electric arc furnaces.

Presently electric arc furnaces produce a natural convection flow of hot gases inside the furnace which moves in a substantially donut shaped circular direction. The hot arc induces plasma which initially flares radially away from the electrode. Soon thereafter the plasma and heated gases rise vertically around the electrode. The void caused by the rising hot gases induces gases from the periphery to flow toward the center of the furnace. The resulting circulation causes the temperature of the electrode to rise. The increase in the electrode's temperature leads to an increase in electrode consumption. The vertical flow around the electrode also causes positive pressure on the electrode port which increases emissions. In addition to heating the electrode, the rising hot gases impinge on the refractory surrounding the electrode and causes its premature deterioration.

When the rising hot gases reach the ceiling of the furnace chamber, the gases flow radially towards the periphery and along the ceiling. Since the ceiling is water-cooled, the gases lose valuable heat which could have been used to preheat the metal scrap. Similarly, energy escapes through the off-gas hole which could have instead been used to preheat the scrap.

Methods for controlling hot gas circulation in a furnace chamber have been previously disclosed. For example European Patent Application 0 462 898 A1 injects gas tangentially around the perimeter of a scrap melting electric arc furnace in two counter rotating horizontal planes. German Patent DE 3629055 A1 injects gases into the furnace cavity aiming the gas jets at the cold spots in the furnace, while at the same time injecting gases through injection ports located underneath the liquid metal level. Neither of the two patents teaches generating a circulation pattern which overcomes the above outlined disadvantages.

SUMMARY OF THE INVENTION

In view of the disadvantageous consequences of the gas currents in the furnace of the prior art, it is an object of the present invention to provide means to control the gas currents in a beneficial manner.

Another object of the invention is to provide an arc furnace wherein gases are injected into the melting chamber to achieve a reversal of the natural interior gas circulation.

It is another object of the invention to provide an arc furnace wherein gases are forcefully injected into the melting chamber so as to cause hot gases to penetrate and preheat the metal scrap.

A further object of the invention is to provide an arc furnace wherein gas containing oxygen is injected into the melting chamber to improve burning of the off-gas.

Yet another object of the invention is to provide an arc furnace wherein the hot gas inside the melting chamber is circulated in a manner so as to induce low pressure about the electrode port; thereby reduce emission.

According a preferred embodiment of the present invention, gas injectors are afixed to the roof of the furnace chamber. The injectors are situated so that the emitted gas is traveling in a downward direction and in the vicinity of the electrode. The gas is injected in such a direction and pressure to cause the hot gas inside the chamber to circulate radially from the electrode at the lower part of the chamber, and towards the electrode at the upper part of the chamber.

DETAILED DESCRIPTION OF THE INVENTION

Figure 1:
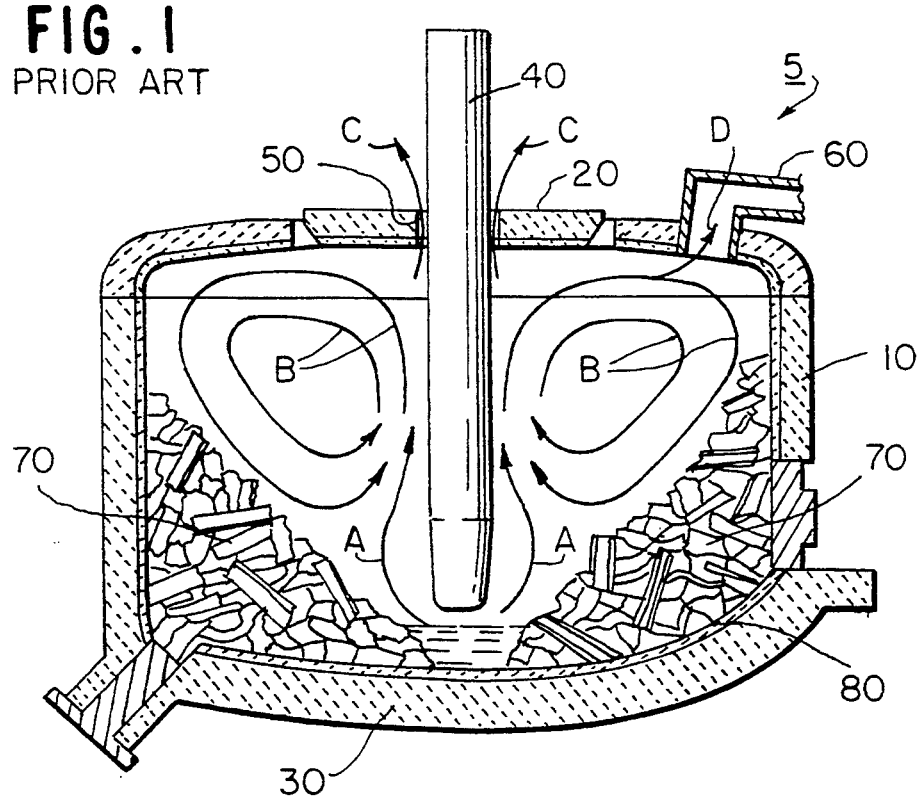
FIG. 1 is a cross-section of an arc furnace according to the prior art.

Turning now to FIG. 1, there is shown a conventional electric arc furnace 5 according to the prior art. The arc furnace 5 comprises a shell 10 having a lid 20 and a base 30. The shell 10, lid 20 and base 30 are generally provided with a refractory layer 80.

During operation, hot gas inside the electric arc furnaces 5 exhibit a circular natural convection flow as shown by the arrows marked B. The flow is induced by the hot electric arc plasma which flares radially away from the tip of the electrode 40 and rises up around the electrode 40 due to the gas's very low density; as generally denoted by the arrows marked A. This flow around the electrode 40 raises the electrode's temperature and leads to an increase in its consumption. The upward current of the hot gas causes positive pressure on the electrode port 50. This leads to increased emissions from between the electrode 40 and the electrode port 50, as demonstrated by the arrows marked C. In addition, the impinging hot gas burns up the refractory layer 80 surrounding the electrode 40. When the rising gas reaches the lid 20, it flows radially outwards from the electrode 40 in close proximity to the generally lower temperature lid 20. Thus, it looses some of its valuable heat. Furthermore, as shown by the arrows marked D, some gas escapes through the off-gas vent 60 without having been in contact with the scrap 70. This causes additional loss of energy.

Figure 2:
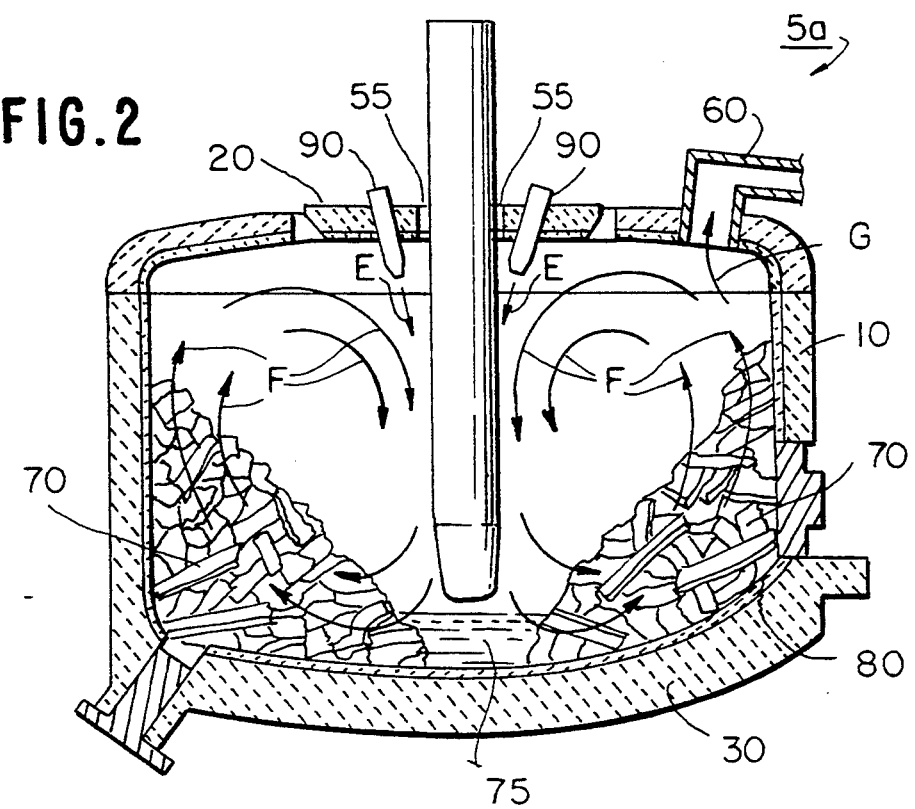
FIG. 2 is a cross-section of an arc furnace according to one embodiment of the present invention.

FIG. 2 illustrates an electric arc furnace 5a according to the preferred embodiment of the present invention, wherein elements which are similar to those of FIG. 1 are denoted with the same characters. According to the invention, the injectors 90 blow gas into the electric arc furnace 5a, as denoted by the arrows marked E. The injectors 90 can be pipes or any other suitably shaped orifice discharging the injected gas into the electric arc furnace 5a. The pressure gradient created by the downward injection of gas into the furnace creates a flow momentum in the direction generally depicted by the arrows marked F. The gas which flows in the direction marked F penetrates the scrap 70 and deposits heat energy thereupon. The scrap 70 thus preheated melts faster than in the furnace 5 according to the prior art. Consequently, in the furnace 5a, according to the present invention, the scrap 70 melts more evenly and efficiently with less waste heat loss.

The circular momentum created by blowing gas into the furnace 5a in this manner also causes low pressure under the gap 55 around the electrode, thus reducing gaseous emissions from the electrode port 50. Moreover, any gas which escapes through the off-gas vent 60, as marked by arrow G, has already been in contact with scrap 70 and deposited substantial amount of usable heat energy thereon.

Although the invention has been described with respect to a furnace having only one electrode, it is readily adaptable to alternating current (AC) electric arc furnaces which have three electrodes.

The injectors 90 design used in the present invention is not of specific importance for establishing the gas flow patterns E and F required to accomplish the advantages of this invention. The injectors 90 location and the number of injectors 90 used is not important as long as the downward flow E around the electrode is established.

By continuing the process described above after the scrap 70 is melted, the invention can also be used to increase the molten metal 75 temperature by increasing the temperature of the atmosphere inside the electric arc furnace 5a and maintaining the high velocity gas flow from the electric arc plasma radially towards the furnace perimeter.

I claim:

1. A method for melting scarp metal placed inside an electric arc furnace having at least one electrode, comprising the steps of:

providing injection means located near the vicinity of said at least one electrode for injecting gas into said electric arc furnace;

using said injecting means to inject gas into said electric arc furnace when said electric arc furnace is operated;

directing said gas so that said gas flows in a downward direction in the vicinity of said at least one electrode, thereby defining a downward flow.

2. The method of claim 1 wherein said electric arc furnace comprises a shell having a lid and whereby said injecting means is situated on said lid.

3. The method of claim 1 wherein said directing means comprises said injecting means situated at a predetermined angle.

4. The method of claim 3 wherein said lid comprises an electrode port and whereby said downward flow induces low atmospheric pressure underneath said electrode port.

5. The method of claim 4, wherein said electric arc furnace comprises one electrode which is energized with direct current.

6. The method of claim 4, wherein said electric arc current comprises three electrodes.

7. An electric arc furnace comprising:
   a shell having a top and a base;
   at least one electrode situated inside said shell;
   at least one injector located near the vicinity of said at least one electrode for injecting gas into said electric arc furnace; and
   whereby said at least one injector injects gas which flows downwardly in the vicinity of said electrode, thereby defining a downward flow.

8. The electric arc furnace of claim 7 whereby said at least one injector is attached to said top.

9. The electric arc furnace of claim 8 wherein said top comprises an electrode port and whereby said downward flow induces a low atmospheric pressure underneath said electrode port.

10. The electric arc furnace of claim 9 wherein said electric arc furnace comprises one electrode which is energized with direct current.

11. The electrode arc furnace of claim 9 wherein said electric arc furnace comprises three electrodes.

* * * * *